US006241922B1

(12) United States Patent
Bishop et al.

(10) Patent No.: US 6,241,922 B1
(45) Date of Patent: Jun. 5, 2001

(54) METHOD FOR MANUFACTURING OPHTHALMIC LENSES

(75) Inventors: Joseph Andrew Bishop, Salem; Charles Foster, Thaxton, both of VA (US)

(73) Assignee: Johnson & Johnson Vision Products, Inc., Jacksonville, FL (US)

( * ) Notice: Subject to any disclaimer, the term of this patent is extended or adjusted under 35 U.S.C. 154(b) by 0 days.

(21) Appl. No.: 09/311,053

(22) Filed: May 13, 1999

(51) Int. Cl.$^7$ ....................................................... B29D 11/00

(52) U.S. Cl. .............................................. 264/1.7; 264/2.5

(58) Field of Search ............................... 264/1.1, 2.5, 1.7, 264/1.8; 425/808, 375

(56) References Cited

U.S. PATENT DOCUMENTS

| 3,038,210 | * | 6/1962 | Hungerford et al. | 425/808 |
| 4,113,224 | * | 9/1978 | Clark et al. | 425/808 |
| 5,141,678 | * | 8/1992 | Blum | 264/2.5 |
| 5,372,755 | * | 12/1994 | Stoerr et al. | 264/1.7 |

FOREIGN PATENT DOCUMENTS

| 0 345 979 B1 | | 12/1989 | (EP) . | |
| 847 345 | * | 9/1960 | (GB) | 425/808 |

* cited by examiner

Primary Examiner—Mathieu D. Vargot
(74) Attorney, Agent, or Firm—Lois Gianneschi

(57) ABSTRACT

The invention provides methods for producing ophthalmic lens by casting resin layers onto an optical preform. Resin containment in the mold assembly is achieved by the use of a high viscosity resin bead.

5 Claims, No Drawings

METHOD FOR MANUFACTURING OPHTHALMIC LENSES

FIELD OF THE INVENTION

The present invention relates to methods for manufacturing ophthalmic lenses. In particular, the invention provides a method for manufacturing lenses by casting.

BACKGROUND OF THE INVENTION

Ophthalmic lenses may be made by any of a wide variety of processes. In one such process, one or more resin layers is cast onto an optical preform to form the desired lens. In certain methods for casting a layer onto a preform, the mold assembly is made of a first mold and the optical preform that serves as the second mold. The preform and first mold are positioned in relation to each other, a polymerizable resin is dispersed between the preform and first mold, and the resin is polymerized to produce a lens from the cast layer and the preform.

A number of mechanical components, such as gaskets, O-rings, and the like have been used to contain the polymerizable resin within the mold assembly. However, the known mechanical components for resin containment are disadvantageous because of the need to clean the components. Additionally, the component size required may vary with variations in the size and shape of the optical preform and mold. Therefore, a need exists for a means to contain the resin that avoids the problems inherent in the use of mechanical components for containing the resin.

DESCRIPTION OF THE INVENTION AND ITS PREFERRED EMBODIMENTS

The present invention provides a method for producing an ophthalmic lens by casting one or more resin layers onto an optical preform in which resin containment in the mold assembly is achieved by the use of a resin bead. The method of the invention eliminates the need for the use of a mechanical component to contain the resin thereby reducing the cost and complexity of the machinery necessary to carry out the casting process.

In one embodiment, the invention provides a method for manufacturing a lens comprising, consisting essentially of, and consisting of applying one or more resin beads at the periphery of a mold assembly. By "lens" is meant any ophthalmic lens including, without limitation, spectacle lenses, contact lenses, intraocular lenses and the like. Preferably, the lens of the invention is a spectacle lens. By "mold assembly" is meant an optical preform, casting resin, and at least one mold half By "optical preform" is meant a shaped, optically transparent article capable of refracting light and possessing a convex and a concave surface, which article is suitable for use in producing a spectacle lens.

It is a discovery of the invention that containment of a resin within a mold assembly may be achieved by the use of one or more resin beads at the periphery of the mold assembly. Preferably, the resin bead or beads are placed along the circumference or edge of the optical preform.

The resin useful to form the one or more beads is of a viscosity effective for the one or more beads to maintain its shape and contain the casting resin within the mold assembly. Typically, resin forming the one or more resin beads will have a viscosity of about 50,000 centipoise to about 100,000 centipoise, preferably about 75,000 to about 100,000 centipoise.

Suitable resins useful for forming resin beads are any resins that will not adversely affect the optical preform or resin cast onto the preform. Preferably, the resins used to form the resin beads are the same as or similar to that used for casting the layer onto the preform. Such resins include, without limitation, acrylates and methacrylates. Exemplary acrylates and methacrylates include, without limitation, di-, tri-, tetra-, and penta-acrylates, ethylene glycol diacrylate, ethoxylated aliphatic diacrylates, ethoxylated trimethylol propane triacrylate, bisphenol A diacrylate, allyl methacrylate, bisphenol A dimethacrylate, and the like and combinations thereof Preferably, the resin used for the resin beads has a viscosity that is greater than that of the resin cast onto the preform.

One ordinarily skilled in the art will recognize that any useful additive may be added to the resin formulation forming the resin beads. Suitable additives include, without limitation, photoinitiators such as 1-hydroxy cyclohexyl phenyl ketone and 2-hydroxy-2-methyl-1-phenyl-propan-1-one and thermal initiators such as organic peroxides, hydroperoxide, percarbonate peracetate and the like and combinations thereof.

The one or more resin beads may be applied to the mold assembly periphery or to the periphery of the optical preform alone. The bead or beads are applied by any convenient means including, without limitation, a positive displacement dispensing pump. The one or more beads may be of any size or shape, but preferably are configured, and are of an amount effective, so as to substantially contain the resin to be cast onto the preform within the mold assembly. The one or more beads may be placed at any point around the periphery of the mold assembly or preform. In an embodiment in which two beads are used, the beads are placed at points on the about the 90° and 270° axis points of the preform and spread towards the 0° and 180° points. Preferably, one or more voids are left so that the resin bead or beads do not completely encircle the preform.

The mold assembly used in the process of the invention may include first and second molds. One of the molds may be, and preferably is, the optical preform. One ordinarily skilled in the art will recognize that the method of the invention may be used whether a layer is cast onto the optical preform's convex surface, concave surface, or both the concave and convex surfaces. Additionally, the invention may be used for the casting of more than one layer onto one or more surfaces of the preform. Suitable methods for casting a lens using an optical preform are disclosed in U.S. Pat. Nos. 5,147,585, 5,178,800, 5,219,497, 5,316,702, 5,358,672, 5,470,892, 5,480,600, 5,512,371, 5,531,940, 5,702,819, 5,793,465, 5,859,685, and 5,861,934 incorporated herein in their entireties by reference.

Generally, to form the lens, a mold assembly is provided by placing the first mold in a relation to the second mold, or optical preform, so that, upon polymerization of the resin, the optical preform and cast layer provide the desired lens. The optical preform may be made of any suitable material used in the manufacture of lenses including, without limitation, polycarbonates, allyl diglycol carbonates, allylic esters, diallyl phenyl phosphonates, acrylic esters, acrylates, methacrylates, styrenics, lexan, polyesters, polyarylene ethers, and the like, and combinations thereof. The preform may be produced by any convenient means including, without limitation, molding, thermoforming, casting, injection-compression molding, and the like.

The mold and the preform may be aligned and oriented by any convenient means. The preform and mold may be rotated or displaced in relation to one another to meet the requirements of the lens to be produced. The polymerizable resin to be cast onto the optical preform may be dispensed into the cavity formed by the first mold and the optical preform. Alternatively, the cast resin may be first dispensed onto a surface of the mold or preform prior to placing the mold and preform in the desired relation. The resin may be partially hardened prior to its dispensing. The dispensing may be carried out by any convenient means including, without limitation, injection.

The cast resin is then cured by any desired, known method, such as by the use of irradiation, heat, visible light, or a combination thereof. One ordinarily skilled in the art will recognize that the resin bead or beads will be polymerized along with the cast resin. After the casted resin is cured to the desired degree, the lens is removed from the mold and the portion formed by the polymerized one or more resin beads is removed from the lens by any convenient means, such as edging.

The invention will be clarified by the following, non-limiting examples.

EXAMPLES

Example 1

An optical preform of −2.25 diopters was loaded onto a tray having a ring to support the preform at its periphery and a resin bead was applied to the preform periphery. The resin bead was composed of an acrylate resin and initiator, DAROCUR™ 1173. The viscosity of the resin bead was approximately 80,000 cp. An acrylate casting resin was then dispensed onto the preform's exposed surface and a mold half was lowered onto the cast resin. The cast resin was then UV cured by exposing the mold assembly for 30 secs to UV light of approximately 300 nm. The mold was separated from the polymerized cast layer and the lens edged to remove the cured resin bead. The resin bead was observed to form a good barrier for the casting resin as there was no observed leak of casting resin from the mold assembly.

Example 2

The procedure of Example 1 was used except that the resin used to form the resin bead was approximately 10,000 cp. The bead viscosity was insufficient to enable the bead to hold its form and contain the casting resin.

What is claimed is:

1. A method for manufacturing a spectacle lens comprising containing within a mold assembly a resin to be cast onto an optical preform wherein containing is carried out by applying one or more uncured resin beads at the periphery of the mold assembly.

2. The method of claim 1 wherein the viscosity of the one or more resin beads is about 50,000 to about 100,000 centipoise.

3. The method of claim 1, wherein the one or more resin beads is comprised of a resin substantially the same as that used as a casting resin in the mold assembly.

4. The method of claim 3, wherein the one or more resin beads and the casting resin are selected from the group consisting of acrylates, methacrylates, and combinations thereof.

5. The method of claim 1, wherein the one or more resin beads is applied to the periphery of the optical preform.

* * * * *